April 9, 1963 T. R. THOMAS 3,084,762
LUBRICATION SYSTEM
Filed Sept. 16, 1959 3 Sheets-Sheet 1

INVENTOR
Thomas R. Thomas
BY
Dean Fairbank & Hirsch
ATTORNEYS

April 9, 1963

T. R. THOMAS 3,084,762

LUBRICATION SYSTEM

Filed Sept. 16, 1959

INVENTOR.
THOMAS R. THOMAS
BY
ATTORNEY

April 9, 1963 T. R. THOMAS 3,084,762
LUBRICATION SYSTEM
Filed Sept. 16, 1959 3 Sheets-Sheet 3
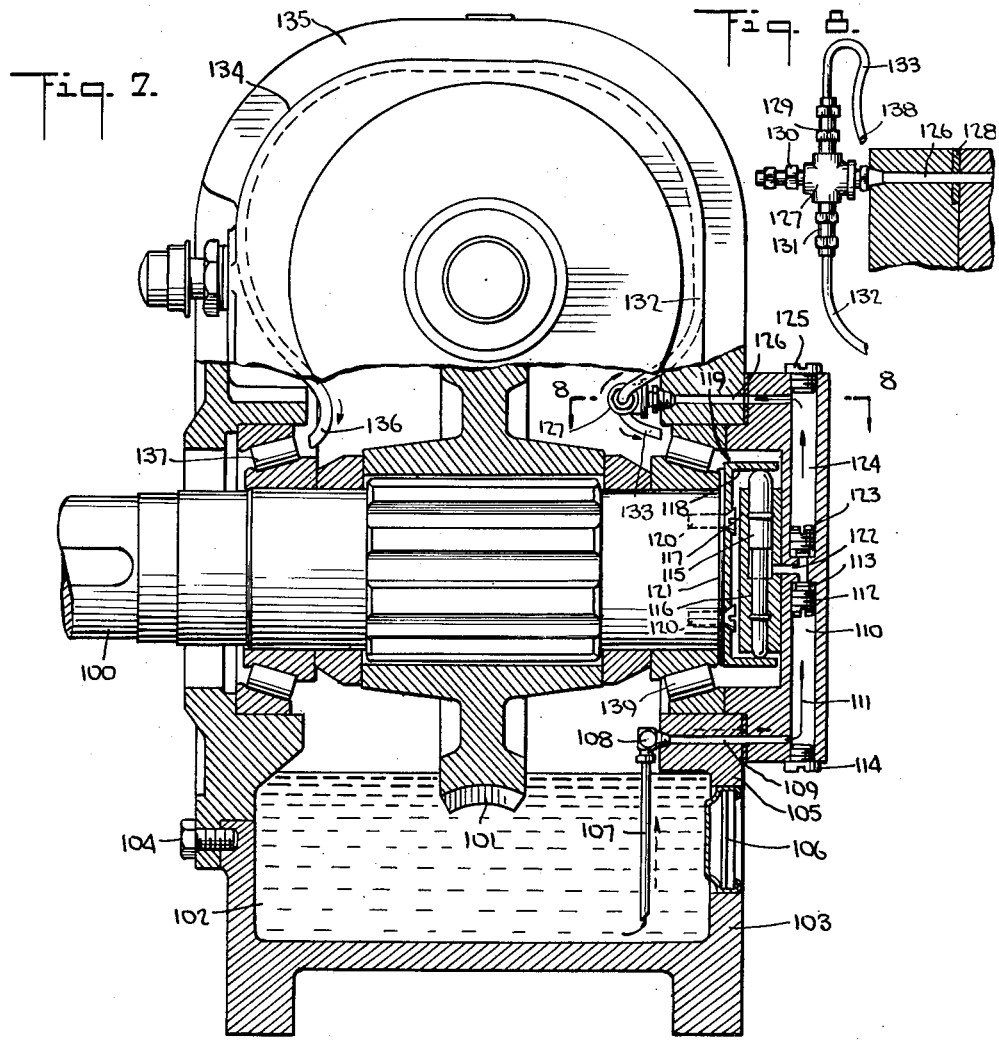
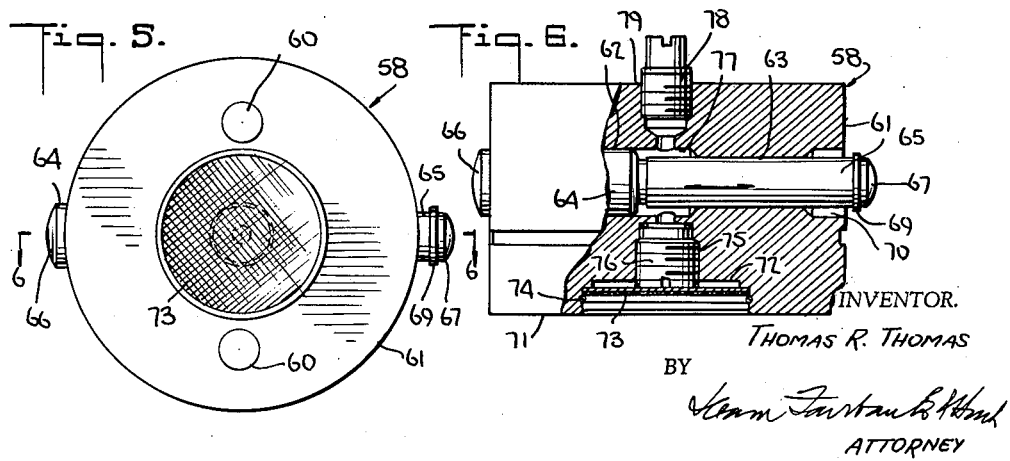
INVENTOR.
THOMAS R. THOMAS
BY
ATTORNEY United States Patent Office
3,084,762
Patented Apr. 9, 1963

3,084,762
LUBRICATION SYSTEM
Thomas R. Thomas, New York, N.Y., assignor to Auto Research Corporation, Dover, Del., a corporation of Delaware
Filed Sept. 16, 1959, Ser. No. 840,448
1 Claim. (Cl. 184—6)

The present invention relates to lubrication and particularly to a centralized lubricating pump for a centralized lubricating installation.

It is among the objects of the present invention to provide a durable, reliable, small piston pump which will occupy small space and may be readily inserted in mechanisms.

Another object is to provide a simple, volume reliable lubricating pump which may be utilized to supply a predetermined amount of lubricant to a lubricant distributing system and which will be at low cost reliable operation.

A particular object of the present invention resides in the provision of a contact rotary driven type of pump designed to lubricate a plurality of bearings, where the space and means of operation are so restricted as not to permit the use of a pump of substantial volume and where the unit may be conveniently mounted upon the end of a shaft.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a rotary driven piston pump with a reciprocating piston member oscillating in a bore in an eccentric rotary member.

In the preferred form of the invention, the piston has different diameters and has an inlet at one side and an outlet at the opposite side, with the eccentricity of the rotary carrier member causing a reciprocation of the piston.

The pump may be conveniently placed on the end of a shaft element and it may receive its lubricant from a convenient pocket in or about the machine and it may be caused to discharge its lubricant by means of a distributing piping system to various bearings associated with various machine elements.

The pump may be made of various sizes and diameters and it has been found quite convenient to have a piston diameter of about ½ inch in one embodiment, with a stroke per revolution of ¼ inch and a discharge per stroke of about 3 cubic centimeters.

The pump is particularly designed to lubricate a small number of bearings where the space and means of operation are quite limited and where only a relatively few bearings require lubrication in a rather closely restricted space.

The pump may be arranged so as either to be submerged in a lubricant well or so as to be positioned substantially above the lubricant pool or reservoir from which it receives its lubricant supply.

Preferably, the pump body itself rotates and has a double stepped bore receiving the double diameter piston, with the difference in piston areas serving to actively propel the lubricant or oil, as the case may be.

The cam or rounded ends of the piston may contact the walls of the housing so that as the pump rotates, the stepped piston will be caused to reciprocate in the bore because of the eccentricity of the pump body as it rotates.

Desirably, the pump body may be fastened to the end of a rotating shaft, with the pump body being concentric with the shaft but with the enclosing chamber being mounted off center, as for example by ⅛ inch, to give a double piston travel of about ¼ inch, but the maximum stroke may be made greater or lesser than ¼ inch.

The distributing system may be provided with metering units and, if necessary, a safety valve may be provided limiting the maximum pressure at high speeds.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views;

FIG. 5 is a bottom view of the inlet side of the pump of FIG. 4, showing the filter upon an enlarged scale as compared to FIG. 4 and taken upon the line 5—5 of FIG. 4.

FIG. 6 is a transverse vertical sectional view taken upon the line 6—6 of FIG. 5 and showing the detailed construction of the pump upon an enlarged scale as compared to the section as shown in FIG. 4.

FIG. 7 is a side elevational view partly in section to show the utilization of a pump similar to that shown in FIG. 4 but positioned at the end of the shaft above a liquid lubricant pool.

FIG. 8 is a detailed transverse sectional view taken upon the line 8—8 of FIG. 7, on an enlarged scale as compared to FIG. 7.

Figure 1:
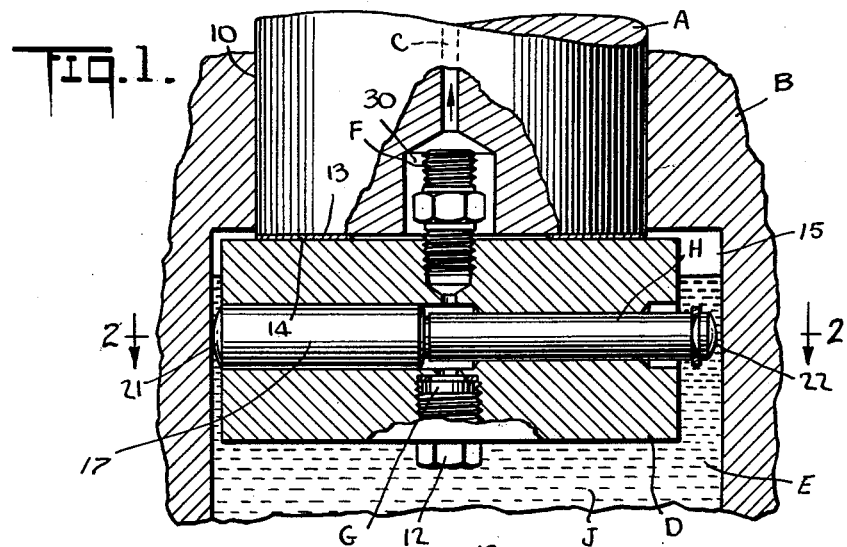
FIG. 1 is a transverse vertical sectional view of the pump structure taken upon the line 1—1 of FIG. 2.
Figure 2:
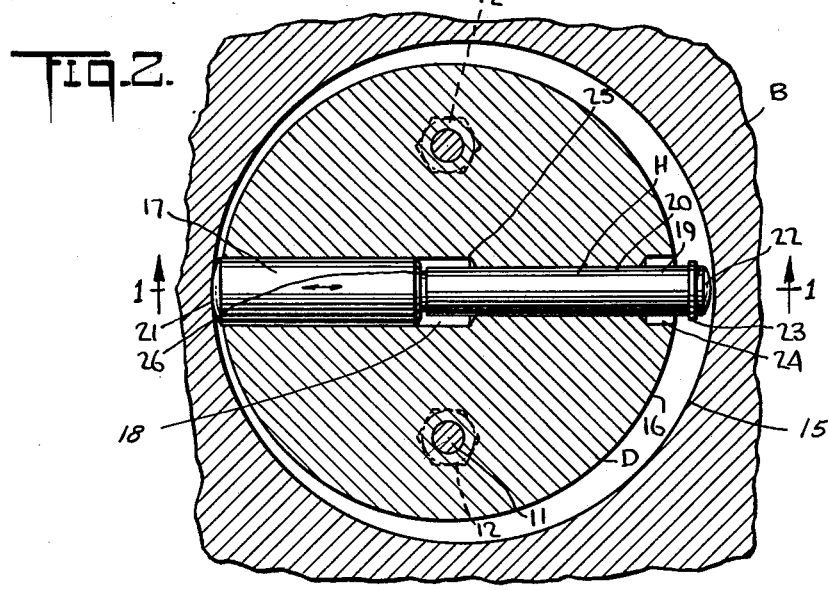
FIG. 2 is a transverse horizontal sectional view taken upon the line 2—2 of FIG. 1.
Figure 3:
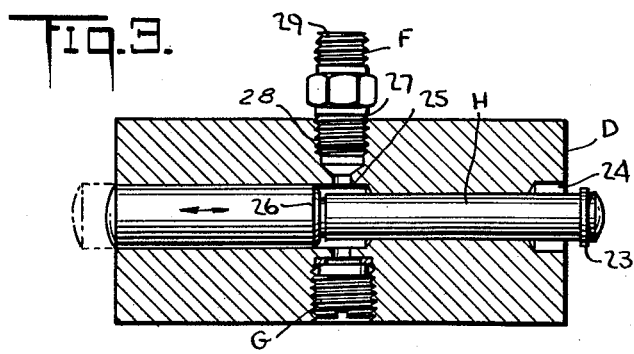
FIG. 3 is a transverse sectional view illustrating the stroke of the pump of FIG. 1 or FIG. 2.

Referring to FIGS. 1 to 3, there is shown an actuating shaft A, forming part of the mechanism to be lubricated, which is indicated in part by the body structure B.

This installation has a lubricant distributing system C, the inlet portion of which is indicated by a central bore through the shaft A.

The pump unit or body D is eccentrically positioned in respect to the reservoir chamber E and it has an outlet check valve or metering unit connection F at one end of the body and an inlet check valve G at the other side of the body and a reciprocating differential piston H. The pool or reservoir of oil J extends above the level of the piston H in the embodiment shown in FIGS. 1 to 3.

The shaft A may closely fit in the bore 10, and the disk-like pump body D may be bolted to the end of the shaft by the bolts 11, having the heads 12 in the body D.

This body member is clamped to the end 13 of the shaft A with the intervening gasket 14.

The wall 15 of the chamber of reservoir containing the lubricant J will be eccentrically positioned in respect to the outer face 16 of the body D, as is best shown in FIG. 2.

The piston H is desirably integral and it has a wide diameter 17 fitting in the bore 18 and a small diameter section 19 fitting in the bore 20.

Each end of the double piston H will have a rounded contact portion 21 and 22 which will ride on the inside face 15 of the reservoir J.

The piston will also have a retaining ring 23 snapped into a groove adjacent to the small rounded end 22 to hold the piston in position and prevent it from falling out of the assembly when it is to be positioned inside of the chamber 15 and bolted inside of the shaft A. The recess 24 gives clearance to the holder ring 23 so that the piston will not fall out of position.

The pump chamber 25 will be changed in volume as the shoulder 26 reciprocates therein, first creating a suction and then creating a pressure.

When the suction occurs, the pump will draw lubricant into the chamber 25 through the inlet check valve G.

This occurs when the enlarged diameter portion 17 moves to the left, as shown in FIGS. 1 to 3.

On the other hand, when the large diameter in 17 moves to the right a compression will be caused to arise in the chamber 25, closing the check valve G and causing the lubricant to be forced out through the outlet check valve fitting F.

The outlet check valve fitting F may also be a meter unit and it has a pipe threaded end 27 which screws into the socket 28, and its outwardly discharging outlet end 29 fits in the recess 30 in the end of the shaft A, which communicates with the bore C.

It will be noted that as the pump of FIGS. 1 to 3 is rotating the differential piston H will be caused to reciprocate and, in one preferred embodiment, the stroke will be about ¼ inch, which is about the eccentricity of the body D in respect to the body B which is indicated by the difference between the solid line and dot and dash line positions in FIG. 3.

With one type of pump, as shown in FIGS. 1 to 3, the double piston diameter may have a maximum of ½ inch, a minimum of ⅜ inch, and a differential area of .0859 square inch, in which case the stroke per revolution may be ¼ inch and the approximate discharge per stroke 0.3 cubic centimeter.

For example in FIGS. 1 to 3 the diameter at 17 may be one-half inch and the diameter at 20 may be three-eighths of an inch which will give a difference in cross sectional area of .0859 square inch.

Figure 4:
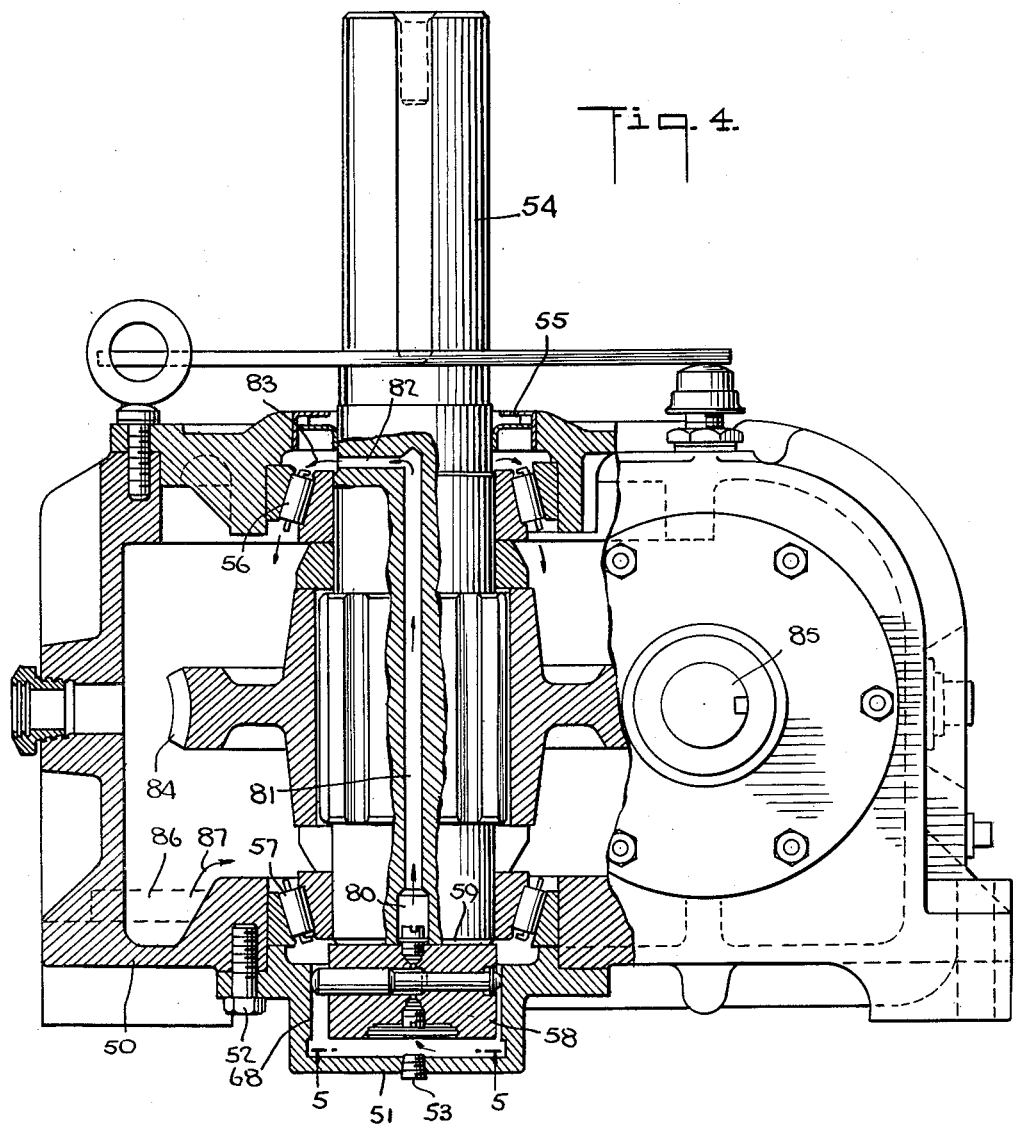
FIG. 4 is an elevational view partly in section, showing the application of the pump of the present invention to an installation on the end of a shaft of a mechanism to be lubricated, with the pump being immersed in a body of lubricant.

Referring to FIGS. 4, 5 and 6, there is shown the use of the pump for feeding lubricant to the roller bearings of a gear housing.

The housing 50 has a well 51 mounted thereon by the bolts 52. A screw plug 53 is mounted in the bottom of the well 51.

The vertical shaft 54 extends into the housing past the seal 55 and it is held in position by means of the upper and lower roller bearings 56 and 57 respectively.

The pump unit 58 is mounted on the end 59 of the shaft 54 by means of bolts not shown which extend through the openings 60. (See FIG. 5.)

The pump unit itself, as shown in small scale in FIG. 4 and in large scale in FIGS. 5 and 6, has a circular body 61, with a differential bore having a large portion 62 and a small portion 63. (See FIG. 6.)

The bore receives a differential piston having a large diameter portion 64 and a small diameter portion 65.

These portions have rounded contact ends 66 and 67 which contact the interior wall 68 of the chamber or well 51.

The retainer ring 69 will hold the differential piston 64—65 in position within the bore 62—63 and the recess 70 will receive said ring 69 during the reciprocating movement of the piston. The inlet side 71 of the pump unit 58 has a recess 72 receiving the double strainer 73, held in position by the split ring 74.

There is also a smaller chamber 75, which is tapped to receive the check valve 76.

The check valve 76 will discharge into the pump chamber 77 so that lubricant may be drawn into this chamber when the large diameter portion 64 moves to the left.

The outlet check valve 78 is threaded into the top socket 79 in the top of the pump body 58 and it will discharge into the chamber 80 (see FIG. 4) and thence into the axial bore 81.

This bore has a right angle portion 82 which discharges lubricant as indicated at 83 on to the upper roller bearing 56. Thence it will flow over the gear teeth 84, which are driven by a worm on the shaft 85 and from the teeth 84 it will flow into the sump 86.

When the sump 86 fills up, the excess lubricant will flow, as indicated at 87, over on to the roller bearings 57 and then into the sump for the pump unit 58, assuring continuous lubrication.

This embodiment of FIGS. 4 to 6 shows the pump mounted directly in the oil bath with the oil returning through the bearing and over the gear, back to the reservoir pool J.

The speed of the shaft 54 may vary from 20 r.p.m. to several hundred r.p.m. and the unit 58 merely acts as the valve without metering function.

In the alternative embodiment of FIG. 7, the shaft 100 is positioned horizontally with the gear 101 rotating in the oil bath 102 in the reservoir or oil sump 103, which is mounted by means of the bolts 104.

In the wall 105 there may be provided a sight glass unit.

In this embodiment, the inlet pipe 107 will draw lubricant from the body 102 and feed it through the junction 108 and the bore 109 to the inlet passageway 110, as indicated by the arrow 111. The inlet check valve 112 will be inserted in the bore 110 against the shoulder 113 and it will be accessible by means of the screw plug 114.

The differential piston 115 reciprocates in the differential bore 116 in the pump body 117. The pump body 117 turns eccentrically within the walls 118 of the cup 119.

The cup 119 is held in position by the screws or bolts 120 on the end 121 of the shaft 100. The lubricant will flow into the pump and out of the pump by means of the transverse bore 122, and on its outward passage it will be forced past the outlet check valve 123 into the outlet passage 124.

The end of the passageway 124 is closed by the screw plug 125 and the lubricant will then flow through the bore 126 to the outlet junction 127.

This outlet junction 127 is shown in small scale in FIG. 7 and in large scale in FIG. 8. It will be noted that there is a sealing gasket 128 provided (see FIG. 8) and that the junction 127 has the outlets 129, 130 and 131.

The outlets 129 and 131 supply lubricant to the tubing 132 and 133.

As shown in FIG. 7, the tubing 132 will extend at 134 around the housing 135 and will drip lubricant, as indicated at 136, upon the roller bearing 137. The tubing 133 will drip lubricant from its end 138 upon the other roller bearing 139.

In the embodiment shown in FIG. 7, the outlets 129, 130 and 131 may constitute metering units and the outlet 130 may constitute a safety valve to give relief if the pressure exceeds 50 to 100 pounds per square inch, where the shaft 100 rotates too rapidly and creates too high a pressure.

It will be noted that in the embodiment of FIG. 7 the pump is not mounted in the reservoir but above the reservoir and it draws lubricant up from the reservoir.

In all embodiments, the pump is a small, compact cylindrical unit readily positioned at the end of a shaft and capable of supplying the lubricant required for a small number of bearings in a very limited space.

It is thus apparent that the applicant has provided a small, compact, reliable rotary pump which may supply either at constant volume or constant pressure to give a reliable lubricant feed in association with a machine structure in accordance with its lubricant requirements.

While there has herein been illustrated and described the preferred embodiment of the invention, it is to be understood that applicant does not limit himself to the precise construction herein disclosed, and the right is reserved to all changes and modifications coming within the scope of the invention as defined in the appended claim.

Having now particularly described and ascertained the nature of the invention, and in what manner the same is to be performed, what is claimed is:

A centralized lubricating pump installation comprising a mechanism having a plurality of bearings to be lubricated, said mechanism further having a machine housing, a vertical shaft having an upper end, a lower end, and a longitudinal axis, said shaft extending through and projecting below said housing, means to rotate said shaft, a longitudinal bore passing through said shaft coincident with said longitudinal axis, and passages connecting said longitudinal bore at the upper end of said shaft to said plurality of bearings, a pump body comprising a cylindrical disk having an upper end, a lower end, a longitudinal axis, and an outside diameter, said cylindrical disk being fixed with its upper end in liquid-tight relationship to the lower end of said shaft for rotation therewith, the longitudinal axis of said disk being in line with the longitudinal axis of said shaft, a transverse bore passing diametrically through said disk between said upper end and said lower end of said disk, said transverse bore having a first portion with a large diameter extending more than halfway through said disk, and a second portion with a smaller diameter in communication with said first portion and extending through the remainder of said disk, a bore shoulder being formed where said first and second portions meet, a plunger reciprocably mounted in said transverse bore, said plunger having a first portion with an outside diameter substantially equal to said large diameter of said first portion of said transverse bore, and said plunger having a second portion with an outside diameter substantially equal to said smaller diameter of said second portion of said transverse bore, said first portion of said plunger having an inside end and an outside end, and being shorter in length than said first portion of said transverse bore, said second portion of said plunger having an inside end and an outside end and being longer in length than said second portion of said transverse bore, the overall length of said plunger being longer than the overall length of said transverse bore, said inside ends of said first and second portions of said plunger being integrally and concentrically attached to each other, a plunger shoulder being formed where the inside ends of said plunger are attached, a pump cavity being formed between said shoulders, said outer ends of said first and second portions of said plunger being rounded, a cup-shaped, lubricant-receiving reservoir mounted on said housing to surround said lower end of said shaft and said pump body, said reservoir having an inside bottom wall and an inside side wall, said reservoir having a longitudinal axis and an inside diameter, said reservoir being mounted on said housing with its longitudinal axis being eccentrically offset from the longitudinal axes of said shaft and said disk, the inside diameter of said reservoir being substantially equal to the overall length of said plunger whereby said rounded outside ends of said plunger ride on said inside side wall of said reservoir when said shaft is rotated and thereby reciprocate said plunger in said transverse bore to move said shoulder of said plunger relative to said shoulder of said transverse bore and vary the volume of said pump cavity, an inlet bore and an outlet bore in said pump body, each of said inlet and outlet bores having two ends, one end of said inlet bore being in communication with said reservoir, the other end of said inlet bore being in communication with said pump cavity, one end of said outlet bore being in communication with said pump cavity, the other end of said outlet bore being in communication with said longitudinal bore in said shaft, check valves in each of said inlet and outlet bores, whereby when the volume of said pump cavity is expanded a suction will be created and lubricant from said reservoir will be sucked through said inlet bore and its check valve to said pump cavity and when the volume of said pump cavity is decreased a pressure will be created and lubricant will be pushed from said pump cavity through said outlet bore and its check valve, said longitudinal bore in said shaft, and said passages to said plurality of bearings, and means to return said lubricant from said plurality of bearings to said reservoir.

References Cited in the file of this patent

UNITED STATES PATENTS

| | | |
|---|---|---|
| 1,570,668 | Griffith | Jan. 26, 1926 |
| 2,140,956 | Hall | Dec. 20, 1938 |
| 2,256,754 | Schmitter et al. | Sept. 23, 1941 |
| 2,327,962 | Drake | Aug. 24, 1943 |
| 2,595,692 | Murphree | May 6, 1952 |
| 2,793,714 | Luenberger | May 28, 1957 |

FOREIGN PATENTS

| | | |
|---|---|---|
| 146,158 | Great Britain | Apr. 21, 1921 |